(12) United States Patent
Faÿ et al.

(10) Patent No.: US 7,328,394 B2
(45) Date of Patent: Feb. 5, 2008

(54) ADAPTATIVE FORWARD ERROR CONTROL SCHEME

(75) Inventors: Laurent Faÿ, La Frette sur Seine (FR); Jean-Marc Reme, Montigny le Bretonneux (FR); Christophe Samson, Paris (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 73 days.

(21) Appl. No.: 10/532,927

(22) PCT Filed: Oct. 16, 2003

(86) PCT No.: PCT/IB03/04588

§ 371 (c)(1),
(2), (4) Date: Apr. 27, 2005

(87) PCT Pub. No.: WO2004/040831

PCT Pub. Date: May 31, 2004

(65) Prior Publication Data

US 2006/0031738 A1   Feb. 9, 2006

(30) Foreign Application Priority Data

Oct. 30, 2002 (EP) .................... 02292707

(51) Int. Cl.
*H03M 13/00* (2006.01)

(52) U.S. Cl. .................................. 714/776

(58) Field of Classification Search .......... 714/776, 714/712, 716, 708, 774, 748, 750, 778, 752, 714/758, 751
See application file for complete search history.

(56) References Cited

U.S. PATENT DOCUMENTS

| | | | | |
|---|---|---|---|---|
| 5,130,986 A | * | 7/1992 | Doshi et al. | 370/231 |
| 5,699,365 A | * | 12/1997 | Klayman et al. | 714/708 |
| 5,699,369 A | * | 12/1997 | Guha | 714/774 |
| 6,170,075 B1 | | 1/2001 | Schuster et al. | |
| 6,477,669 B1 | * | 11/2002 | Agarwal et al. | 714/708 |
| 6,615,382 B1 | * | 9/2003 | Kang et al. | 714/748 |

FOREIGN PATENT DOCUMENTS

WO    WO9904338    1/1999

OTHER PUBLICATIONS

E. Yuen et al; "Variable Rate Speech and Channel Coding for Mobile Communication", Vehicular Tech. Conf., 1994 IEEE 44th Stockholm, Sweden Jun. 8, 1994, pp. 1709-1713; XP010123426.

* cited by examiner

*Primary Examiner*—Jacques Louis-Jacques
*Assistant Examiner*—Fritz Alphonse

(57) ABSTRACT

A transmitter uses an adaptive forward error control scheme that includes redundant packets to reduce packet error rate at a receiver. The receiver analyzes the received packet error rate before correction to determine an optimal level of redundancy required to respect a maximum tolerated packet error rate after correction, and communicates this determined optimal level to the transmitter for controlling the amount of redundancy in subsequent transmissions from the transmitter.

10 Claims, 3 Drawing Sheets

ADAPTATIVE FORWARD ERROR CONTROL SCHEME

FIELD OF THE INVENTION

The invention relates to an adaptive Forward Error Correction scheme (FEC) aiming at providing a resilient transport of data via a packet-switched transmission network.

The invention also deals with a transmission system, a transmitter and a receiver implementing such a forward error control scheme.

The invention also deals with a method for determining an amount of redundancy to be used in such a forward error correction scheme.

The invention advantageously applies to the transport of data via a transmission network having a time-varying state, for instance, a mobile transmission network.

BACKGROUND OF THE INVENTION

International patent application WO99/04338 describes an adaptive forward error correction scheme to be used for transmission via wireless satellite links.

The forward error correction scheme described in this document operates at the data link level of the OSI reference model (a forward error correction code is included in each frame for error correction of this frame). It includes the steps of: calculating a byte error rate, determining a forward error correction code length based on this byte error rate, and feeding back the forward error correction code length to the transmitter. The value of the forward error correction code length is selected in a table storing inverse byte error rate values in association with forward error correction code lengths.

Because it is implemented at the data link level, the proposed method is not well suited to heterogeneous transmission networks like the Internet. Using the described method in a heterogeneous transmission network would lead to a separate adaptation of the forward error correction scheme in each network section that is gone through. This would be very complex to implement.

Furthermore, using a table to determine the error correction code length has several drawbacks.

First, certain assumptions about the repartition and the size of the errors are made in order to derive the values stored in the table. Consequently, the proposed method is not well suited to transmission networks whose states may vary in an important manner, such as mobile networks like GSM, UMTS, GPRS . . .

Second, by the values stored in the table are derived so as to obtain a certain quality after correction. This means that the receiver must store as many tables as achievable qualities.

OBJECT AND SUMMARY OF THE INVENTION

It is an object of the invention to propose an adaptive forward error control scheme that overcomes these drawbacks.

This is achieved with a transmission system as defined in claims 1 to 3, a receiver as defined in claims 4 to 6, a transmitter as defined in claims 7 and 8, a method for determining the amount of redundancy to be used in a forward error control scheme as defined in claim 9, and a program as defined in claim 10.

In the adaptive forward error correction scheme of the invention, redundancy packets are generated at the application layer of the transmitter from media packets. Therefore, when erroneous packets are discarded by the transport layer at the receiver side, the application layer is capable of recovering a certain number of packets from the packets it receives. According to the invention, the amount of redundancy that is added at the transmitter side is adapted so as to obtain a correction capability allowing to respect a maximum tolerated packet error rate. According to the invention, the quality of the transmission network is estimated by watching the packet error rate.

Since it is implemented at the application layer, the method of the invention is transparent to the transmission network. It is therefore easily applicable to heterogeneous transmission networks.

Since the quality of the transmission network is estimated by using the packet error rate instead of the byte error rate, the use of tables can be avoided.

The invention guarantees a maximum tolerated packet error from end to end. Advantageously, the maximum tolerated packet error rate is set by the application that is using the received media packets.

In an advantageous embodiment of the invention, the bitrate of the media packets is adapted as a function of k so as to compensate for the variations of the bitrate of the redundancy packets.

BRIEF DESCRIPTION OF THE DRAWINGS

These and other aspects of the invention are further described with reference to the following drawings.

DESCRIPTION OF A PREFERRED EMBODIMENT

The invention applies to any FEC scheme. In the examples described in the following, the FEC code is characterized by two parameters k and n, where k is the number of media packets, and (n–k) is the number of redundancy packets generated from the k media packets. The parameter n has a constant integral value. The amount of redundancy is adapted by varying the value of the parameter k. This is not restrictive.

Figure 1:
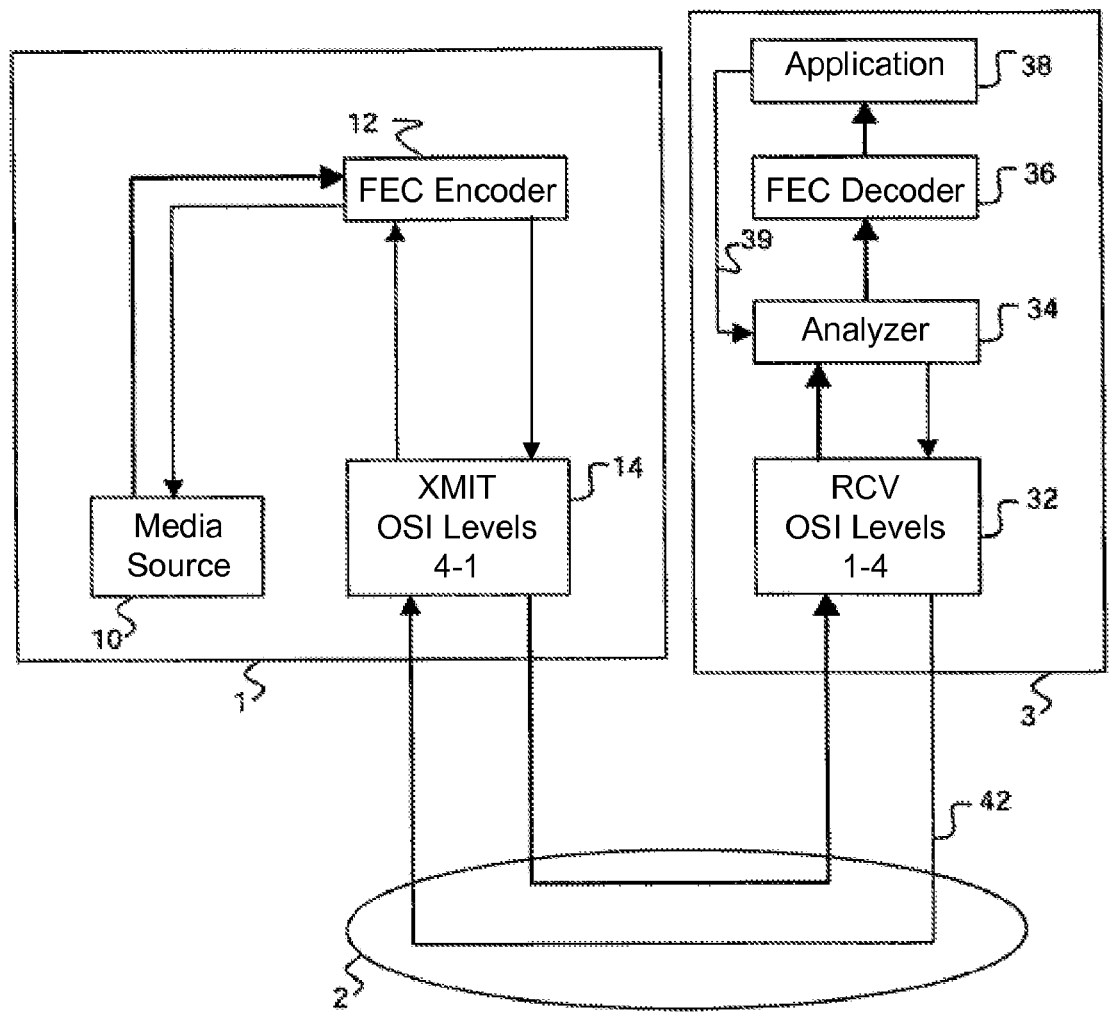
FIG. 1 is a schematic drawing of a transmission system according to the invention.

FIG. 1 shows an example of a transmission system according to the invention comprising a transmitter 1, a transmission network 2 and a receiver 3. In this example, the transmission network 2 is composed of the Internet network and of a radio access network (for instance, a network compliant with the GPRS or the UMTS standards). The transmitter 1 comprises a media source 10 for delivering media packets, a FEC encoder 12 for generating redundancy packets from media packets received from the media source 10, and a transmission/reception block 14 implementing the first four layers of the OSI reference model. In this example, the network protocol (OSI layer 3) is IP (Internet Protocol) and the transport protocol (OSI layer 4) is RTP (Real time Transfer Protocol) over UDP (User Datagram Protocol). The receiver 3 comprises a transmission/reception block 32 that implements the first four layers of the OSI reference model, an analyser 34, a FEC decoder 36 and an application block 38.

Figure 2:
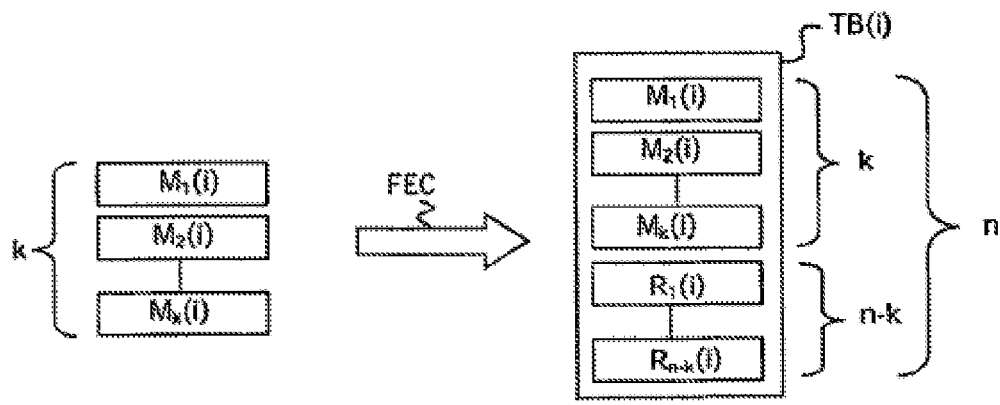
FIG. 2 is a schematic representation of the generation of a transmission block.

As represented in FIG. 2, the encoder 12 generates (n–k) redundancy packets $R_1(i), \ldots, R_{n-k}(i)$ from k media packets $M_1(i), \ldots, M_k(i)$. The (n–k) redundancy packets and the k media packets form a transmission block TB(i). The redundancy packets are intended to provide a correction capability of Q(k) packets at the receiver.

At the receiver side, the UDP protocol controls the UDP checksum for each received packet. It discards the packets for which at least one bit error is detected. The packets that are correctly received are forwarded to the FEC decoder 36. The FEC decoder 36 is capable of recovering the discarded packets from the packets that it receives if the number of discarded packets is smaller or equal to Q(k).

Advantageously, the code used to generate the redundancy is a Reed Solomon code RS(n,k). The correction capability of a Reed Solomon code RS(n,k) is Q(k)=n–k.

According to the invention, the amount of redundancy is adapted depending on the state of the network so as to use the bandwidth in an optimal way. If the transmission network is in a good state, the amount of redundancy shall be decreased so that a larger part of the bandwidth can be dedicated to the transmission of media packets. In contrast, if the transmission network is in a bad state, the amount of redundancy shall be increased so as to increase the chances of recovering discarded media packets at the receiver side.

Advantageously, k shall not be smaller than a minimum value $k_{min}$ corresponding to a maximum tolerated amount of redundancy.

Figure 3:
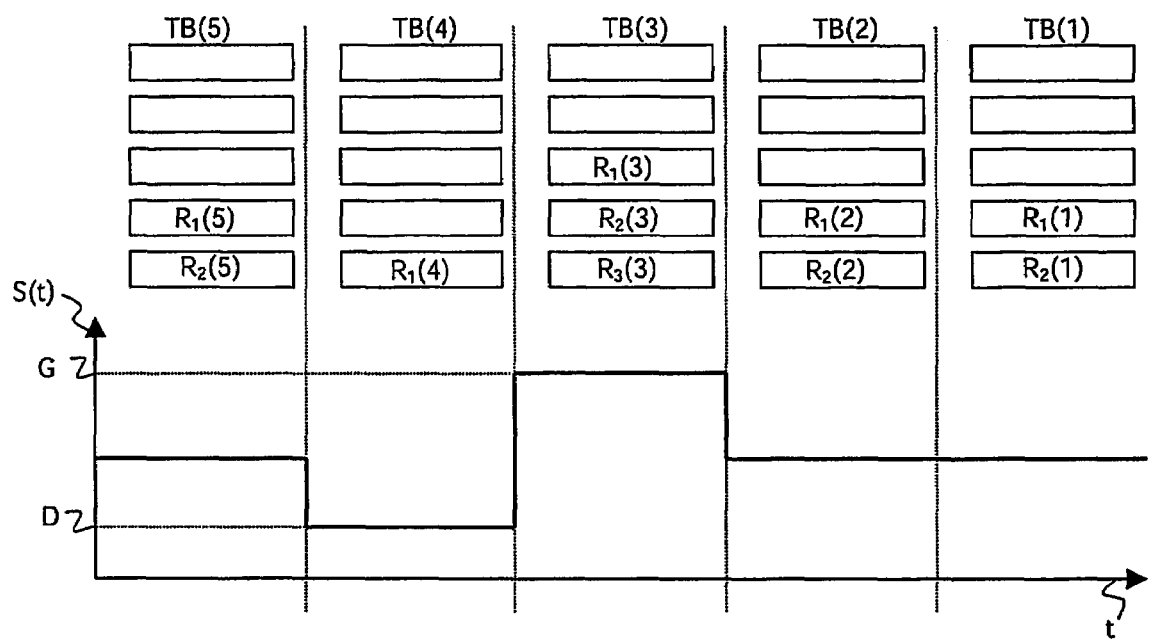
FIG. 3 is a schematic representation of the adaptation of the amount of redundancy contained in a transmission block depending on the state of the transmission network.

An example of such an adaptation is represented schematically in FIG. 3. The curve S gives the evolution of the state S(t) of the transmission network as a function of time t. The mark G on the Y-axis indicates a good state. The mark D on the Y-axis indicates a bad state. The composition of the transmission blocks TB(i) is indicated in relation with the curve S. It can be seen that the number $k_i$ of media packets transmitted in the transmission block TB(i) is higher when the state of the network is better.

The adaptation of the amount of redundancy contained in the transmission blocks TB(i) is controlled by the analyser 34. The analyser 34 analyses the packet errors occurring on the transmission network and generates orders 42 for the FEC encoder 12. The orders 42 contain an optimal value $k_{optimal}$ to be used by the FEC encoder 12. They are transmitted to the transmitter 1 using RTCP feedback messages.

Figure 4:
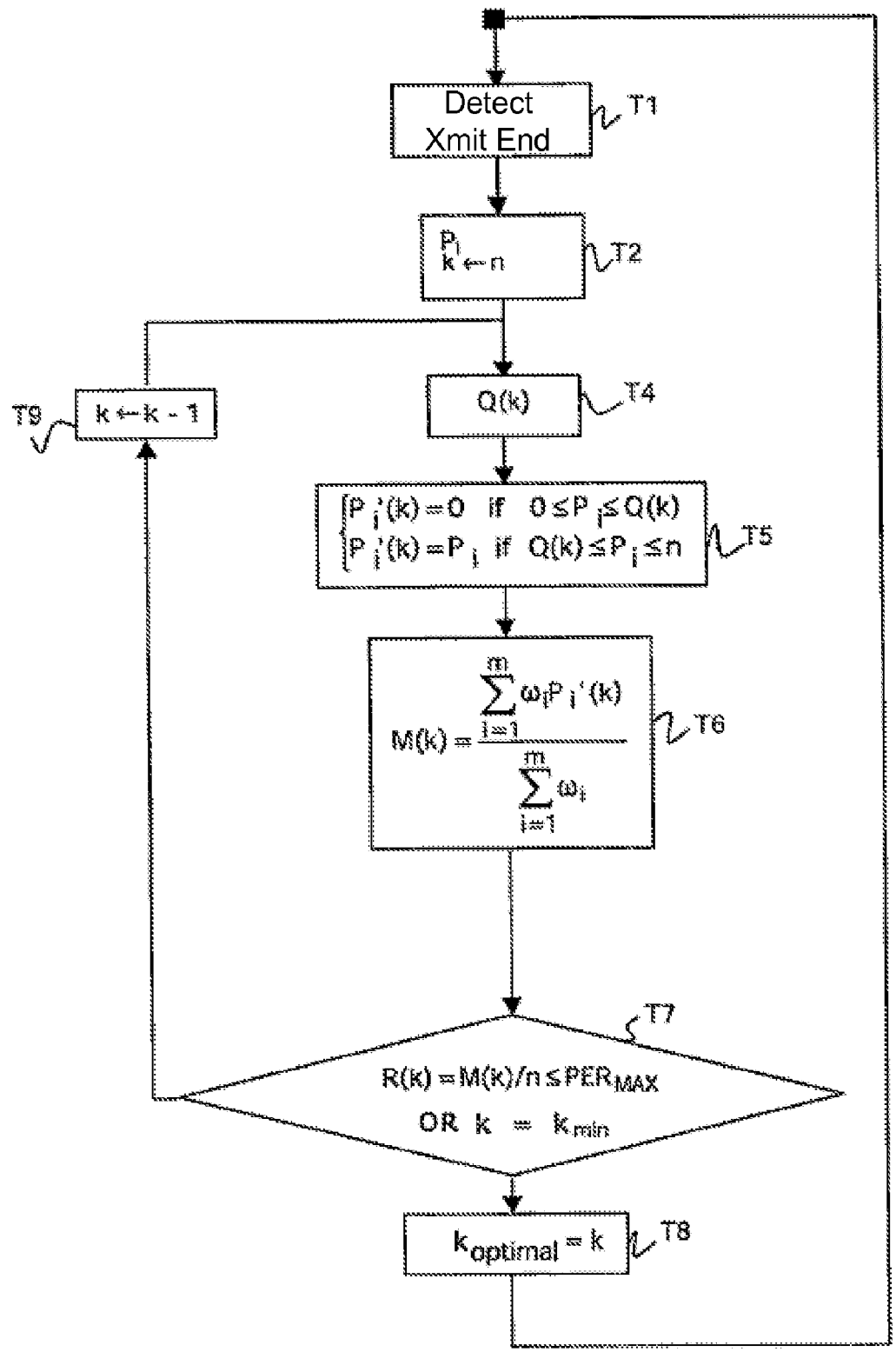
FIG. 4 is a block diagram of a method for determining an amount of redundancy to be used in a forward error correction scheme according to the invention.

The operations of the analyser 34 will now be described in more detail with reference to FIG. 4.

For computing $k_{optimal}$, the analyser 34 keeps a history of the number $P_i$ of packet errors in the received transmission blocks TB(i). Preferably, the size of this history corresponds to several Round Trip Times through the transmission network. The number of packet errors in a transmission block TB(i) is equal to the number of lost packets. Packet losses are detected by using the RTP sequence numbers (the header of the RTP packet contains a sequence number; the value of the sequence number is incremented by one each time a packet is transmitted; at the receiver, missing sequence numbers correspond to lost packets).

When the analyser 34 detects the end of a transmission block TB(i) (box T1 in FIG. 4), it calculates and stores the number $P_i$ of packet errors in this transmission block (box T2).

Then the analyser 34 executes the following operations for k varying from n to $k_{min}$.

The analyser estimates the capability correction Q(k) (box T4).

Given the number $P_i$ of packet errors and the correction capability Q(k), the analyser 34 computes the number $P_i'(k)$ of packet errors after correction (box T5):

$$\begin{cases} P_i'(k) = 0 \text{ if } 0 \le P_i \le Q(k) \\ P_i'(k) = P_i \text{ if } Q(k) < P_i \le n \end{cases}$$

The analyser 34 calculates a mean value M(k) of the number $P_i'(k)$ of packet errors after correction (box T6). Advantageously, more importance is given to the last packet errors when calculating the mean value M(k) because they are more meaningful for the knowledge of the current network state. This allows faster reaction to the variations of the transmission network. For instance:

$$M(k) = \frac{\sum_{i=1}^{m} \omega_i P_i'(k)}{\sum_{i=1}^{m} \omega_i}$$

where m is the number of transmission blocks in the history and:

$$\begin{cases} \omega_i = 1 \text{ for } 1 \le i \le m/2 \\ \omega_i = 1 - \frac{i - m/2}{m/2 + 1} \text{ for } m/2 < i \le m \end{cases}$$

The corresponding packet error rate R(k)=M(k)/n is compared with a maximum tolerated packet error rate $PER_{MAX}$ (box T7). If $R(k) \le PER_{MAX}$ or if $k=k_{min}$, then $k_{optimal}$ is set to the current value of k ($k_{optimal}=k$) and it is sent in a feedback message to the FEC encoder 12 (box T8). In the other cases, k is decreased by one (box T9) and the above-mentioned operations are executed for the new value of k.

In a preferred embodiment, the maximum tolerated packet error rate is set by the application block 38 (arrow 39 in FIG. 1). Different applications can thus set different maximum tolerated packet error rates.

The optimal value of k is the highest value of k allowing to respect the maximum tolerated packet error rate $PER_{MAX}$ after correction.

Alternatively, the new value of $k_{optimal}$ is fed back to the transmitter only when it differs from the previous one.

Advantageously, the media source 10 delivers media packets with an adaptable bitrate, called media bitrate, and the media source 10 is controlled by the FEC encoder 12 in order to adapt the media bitrate as a function of k with the aim of compensating for the variation of the redundancy bitrate. In a first embodiment, the media source is a real time encoder whose encoding bitrate is changed on the fly under reception of an order from the FEC encoder. In a second embodiment, the media source 10 comprises a file switcher intended to switch between several pre-encoded files, each pre-encoded file corresponding to a specific media bitrate.

For applications operating at a constant bitrate CB, the media bitrates MB(k) of the pre-encoded files are advantageously chosen as follows:

$$MB(k) = \frac{k}{n} CB \text{ for } k_{\min} \leq k \leq n.$$

In another embodiment (not represented here), the transmitter comprises a rate control block intended to estimate the current channel bitrate and control the media source 10. In this embodiment, the media source adapts the media bitrate depending on k and depending on an order received from the rate control block so that the overall bitrate (equal to the sum of the media bitrate and the redundancy bitrate) matches the current channel bitrate.

The functions of the analyser 34 that have just been described are implemented in software on a processor of the receiver 3.

With respect to the described system, transmitter, receiver and method of determining the amount of redundancy to be added to the media, modifications or improvements may be proposed without departing from the scope of the invention. The invention is thus not limited to the examples provided.

In particular, the media packets and their corresponding redundancy packets are not necessarily transmitted in transmission blocks of a constant size. The order fed back by the receiver is not necessarily the optimal value of k. It could be any indication of the optimal amount of redundancy to add to the media (for instance, it could be the optimal value of (n–k) or the optimal value of the overhead, the overhead being classically defined as $$100 \times \frac{(n-k)}{k} \%\right).$$

The invention is not restricted to the use of Reed Solomon codes. Any correction code whose correction capacity is a function of k and n can be used. The word "comprise" and its conjugations does not exclude the presence of elements or steps other than those stated in the claims. Use of the article "a" or "an" preceding an element or step does not exclude the presence of a plurality of such elements or steps.

The invention claimed is:

1. A transmission system comprising:
a transmitter,
a transmission network having a time varying state, and
a receiver,
wherein:
the transmitter includes an encoder for generating redundancy packets above the OSI Network Level (OSI Level 3) from media packets so as to provide an error correction capability at the receiver, the correction capability depending on the amount of redundancy generated by the encoder, and
the receiver includes an analyser that is configured to analyze packet errors occurring on the transmission network and determine an optimal amount of redundancy that provides an error correction capability allowing to respect a maximum tolerated packet error rate, and is configured to communicate the optimal amount of redundancy to the transmitter for use by the encoder.

2. The transmission system of claim 1, wherein the transmitter includes a media source for delivering the media packets with an adaptable media bitrate, and the encoder is designed to control the media bitrate depending on the amount of redundancy currently added by the encoder.

3. The transmission system of claim 1, wherein the analyser is designed to:
keep a history of numbers of packet errors in a plurality of transmission blocks,
and for different numbers of possible redundancy packets in each transmission block:
calculate a mean value of numbers of packet errors in the plurality of transmission blocks after correction with an error correction capability corresponding to the number of possible redundancy packets,
calculate a corresponding packet error rate based on the mean value, and
compare the corresponding packet error rate with the maximum tolerated packet error rate for selecting the optimal amount of redundancy.

4. A receiver for receiving media packets and redundancy packets transmitted by a transmitter via a transmission network having a time-varying state, the redundancy packets being generated from the media packets above the OSI Network Level (OSI Level 3) so as to provide an error correction capability of a certain number of packets at the receiver, the receiver comprising:
an analyser for analysing packet errors occurring on the transmission network and for determining an optimal amount of redundancy that provides an error correction capability allowing to respect a maximum tolerated packet error rate, and
a feedback device that is configured to feed back the optimal amount of redundancy to the transmitter.

5. The receiver of claim 4, wherein the analyser is designed to:
keep a history of the number $B_i$ of packet errors in a plurality of transmission blocks,
and for different numbers of possible redundancy packets:
calculate a mean value of numbers of packet errors in the plurality of transmission blocks after correction with an error correction capability based on the number of possible redundancy packets,
calculate a corresponding packet error rate, and
compare the corresponding packet error rate with the maximum tolerated packet error rate for selecting the optimal amount of redundancy.

6. The receiver of claim 4, wherein the received media packets are intended to be used by an application, and the maximum tolerated packet error rate is set by the application.

7. A transmitter for transmitting packets to a receiver via a transmission network having a time varying state, the transmitter comprising:
an encoder for generating redundancy packets above the OSI Network Level (OSI Level 3) from media packets so as to provide an error correction capability of a certain number of packets at the receiver, the correction capability depending on an amount of redundancy generated by the encoder, and
the encoder being designed to set the amount of redundancy to an optimal value that gives an error correction capability allowing to respect a maximum tolerated packet error rate defined at the receiver, the optimal value being fed back to the transmitter by the receiver based on prior transmissions from the transmitter.

8. The transmitter of claim 7, including a media source for delivering the media packets with an adaptable media bitrate, wherein the encoder is designed to control the adaptable media bitrate depending on the amount of redundancy generated by the encoder.

9. A method for determining an amount of redundancy to be used in a forward error correction scheme in which redundancy packets are generated from media packets above the OSI Network Level (OSI Level 3) at a transmitter so as to provide a correction capability of a certain number of packets at a receiver, the method comprising:

analysing packet errors occurring on the transmission network at the receiver, determining an optimal amount of redundancy that provides an error correction capability allowing to respect a maximum tolerated packet error rate at the receiver, communicating the optimal amount of redundancy from the receiver to the transmitter.

10. A program stored in computer readable medium comprising instructions for implementing the method of claim 9 when the program is executed by a processor.

* * * * *